(12) United States Patent
Kato et al.

(10) Patent No.: US 6,874,588 B2
(45) Date of Patent: Apr. 5, 2005

(54) FUEL CELL ELECTRIC VEHICLE AND A FUEL CELL SYSTEM BOX

(75) Inventors: Takashi Kato, Saitama (JP); Makoto Anazawa, Saitama (JP); Harumi Hatano, Saitama (JP); Takayuki Ogawa, Saitama (JP); Kiyoshi Shimizu, Saitama (JP); Sachito Fujimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/256,459

(22) Filed: Sep. 26, 2002

(65) Prior Publication Data

US 2003/0062204 A1 Apr. 3, 2003

(30) Foreign Application Priority Data

Sep. 26, 2001 (JP) .................................. 2001-293509
Sep. 20, 2002 (JP) .................................. 2002-274385

(51) Int. Cl.[7] .............................................. B60L 11/18
(52) U.S. Cl. ...................... 180/65.3; 180/65.1; 429/26
(58) Field of Search ........................ 180/65.1, 65.2, 180/65.3, 68.5; 429/26

(56) References Cited

U.S. PATENT DOCUMENTS

| | | | | |
|---|---|---|---|---|
| 5,641,031 A | * | 6/1997 | Riemer et al. ............... | 180/65.3 |
| 5,662,184 A | * | 9/1997 | Riemer et al. ............... | 180/65.1 |
| 5,858,568 A | * | 1/1999 | Hsu et al. .................... | 429/13 |
| 6,220,380 B1 | * | 4/2001 | Mita et al. ................... | 180/65.1 |
| 6,223,843 B1 | * | 5/2001 | O'Connell et al. .......... | 180/65.3 |
| 6,223,844 B1 | * | 5/2001 | Greenhill et al. ........... | 180/65.3 |
| 6,378,637 B1 | * | 4/2002 | Ono et al. ................... | 180/65.3 |
| 6,394,207 B1 | * | 5/2002 | Skala ........................... | 180/65.2 |
| 6,432,568 B1 | * | 8/2002 | Salvador et al. ............. | 429/19 |
| 6,598,691 B2 | * | 7/2003 | Mita et al. ................... | 180/65.1 |
| 6,617,065 B2 | * | 9/2003 | Balasubramanian et al. .. | 429/13 |
| 6,648,085 B2 | * | 11/2003 | Nagura et al. ............... | 180/65.1 |
| 6,656,620 B2 | * | 12/2003 | Katagiri et al. .............. | 429/26 |
| 2004/0062955 A1 | * | 4/2004 | Kubota et al. ............... | 429/9 |
| 2004/0072052 A1 | * | 4/2004 | Yamamoto et al. .......... | 429/34 |
| 2004/0101725 A1 | * | 5/2004 | Kato et al. ................... | 429/24 |

FOREIGN PATENT DOCUMENTS

JP           05-021084           1/1993

* cited by examiner

Primary Examiner—Christopher P. Ellis
Assistant Examiner—Jeff Restifo
(74) Attorney, Agent, or Firm—Anthony A. Laurentano; Lahive & Cockfield, LLP (57) ABSTRACT

The vehicle M which is a fuel cell loading type electric vehicle includes a fuel cell 30, thermoregulator 20 to adjust the temperature of the fuel cell 30; humidifier 40 to supply moisture to the fuel cell; and the high-pressure hydrogen containers 14 and 14, which is filled up with hydrogen. The thermoregulator 20, a fuel cell 30, the humidifier 40, and the high-pressure hydrogen containers 14 and 14 are disposed covering from the front position to the back position of the vehicle, and arranged in the longitudinal direction of the vehicle in this order. Even when there is a collision of vehicles etc., equipment of the fuel cell system, especially a fuel cell is protected from being damaged and also the space of a vehicle compartment or a load room is fully secured, and further, behavior stability etc. is good.

11 Claims, 5 Drawing Sheets

FUEL CELL ELECTRIC VEHICLE AND A FUEL CELL SYSTEM BOX

The present invention relates to a fuel cell loading type electric vehicle carrying a fuel cell, more specifically, the fuel cell loading type electric vehicle and fuel cell system box with an arrangement such as thermoregulator, humidifier, and fuel reservoir.

DESCRIPTION OF THE PRIOR ARTS

A fuel cell loading type electric vehicle carrying a fuel cell is equipped with the fuel cell which generates the electricity for driving vehicles. In order to generate electricity by this fuel cell, fuel and an oxidizer are required and supplied to a fuel cell, wherein hydrogen used as fuel, and the air used as an oxidizer. The hydrogen used as fuel is stored for example by a high-pressure hydrogen container, and supplied to a fuel cell either as it is or as refined hydrogen fabricated by reforming the methanol system-belonging material. Whereas, air is supplied to the fuel cell by taking in the outside air.

Also, a fuel cell loading type electric vehicle includes thermoregulator where temperature adjustment of the fuel cell is performed for activating the fuel cell preferably, and humidifier for humidifying hydrogen and oxygen which are supplied to the fuel cell.

In addition, the fuel cell includes a radiator for cooling a coolant in a cooling device, a motor for driving a wheel, an inverter for adjusting the current of the electricity supplied to this motor, and a power drive unit (PDU) etc.

All of these apparatus are carried in a fuel cell loading type electric vehicle. However, conventionally there is some arrangement structure to be shown for example disclosed in U.S. Pat. No. 6,223,843. This fuel cell loading type electric vehicle is applied for fuel-converting type. Herein, a fuel tank is located in a rear underbody compartment of the vehicle, and the other equipments such as fuel cell, thermoregulator, humidifier, and converter, and the like are located in series within a front vehicle compartment of the vehicle.

On the other hand, fuel cell satisfies a variety of applications in other fields where power generation is required. By way of example, unit assembly type fuel cell power generation system disclosed in JP-A-5-21084 is given. This assembly type fuel cell power generation system is intended to be pluralities of functionally divided units, which are made up of separated functionally divided unit of a fuel cell power generation system, wherein composition element of this functionally divided system is assembled beforehand in the flame having an independent base respectively. Then, these pluralities of functionally divided units are integrally arranged in a single base. This assembly type fuel cell power generation system contributes to facilitating the assembling work or saving time, and makes it possible to achieve a fuel cell power generation system suitable for successive production. In addition, decomposition check and repair can be facilitated to allow the time to be saved.

However, in a fuel cell loading type electric vehicle disclosed in U.S. Pat. No. 6,223,843, apparatus accommodated for various fuel cell systems including a fuel cell are located within a front vehicle compartment of the vehicle. Therefore, when vehicles collide head-on, for example, a problem of being easy to damage all of the apparatus is raised.

Also, various kinds of equipments are located in series within a front vehicle compartment of the vehicle to thereby necessitate a big space to be prepared for accommodation of these equipments. Consequently, the space given within a front compartment of the vehicle will be restricted resulting in the situation that step-on space in the vehicle compartment and load room space will also be restricted.

Furthermore, the weight of the fuel cell itself may also become big in each composition element. When the fuel cell having such weight is carried in a front vehicle compartment of the vehicle, there is also posed a problem that the behavior stability of a car becomes low. In addition, there is also a possibility of a fall of fuel economy and acceleration.

On the other hand, a unit assembly type fuel cell power generation system disclosed in said JP-A-5-21084 is intended to be used so as to stand in a factory plant, for example, and it is not carried in a car. With the fuel cell power generation system arranged in the above manner, if it is used carrying in a car, it is preferably applied to arrange under the floor of a car. However, in such case, there is posed a below-mentioned problem.

First, as for a car, when running, there generated a necessity to protect a fuel cell power generation system from water, mud, stone and dust, etc. However, the fuel cell power generation system disclosed in said official gazette, did not have such a protection function. Further, each unit is disposed in the profile of exposure to outside, thereby allowing easy contact from the outside in the fuel cell power generation system disclosed in the official gazette. However, parts which produce the high voltage are also contained therein. If the parts of these high voltages can be contacted easily, when a maintenance member performs check etc., for example, there is a concern about touching these parts accidentally. Furthermore, the fuel cell power generation system is arranged under the floor, i.e., under vehicle compartment. Then, the hydrogen which leaks from the fuel cell power generation system may enter the vehicle compartment.

Hereupon, object of this invention resides in providing a fuel cell loading type electric vehicle which is characterized by its superiority in a below-mentioned manner, that is:

Even when there is a collision of vehicles etc., equipments of the fuel cell system, especially a fuel cell is protected from being damaged and also the space of a vehicle compartment or a load room is fully secured, and further, behavior stability etc. is good.

Also, as another object of this invention, there is provided a fuel cell system box, wherein when a functionally divided unit type fuel cell system is introduced in a vehicle, protection from water, mud, stone and dust, etc., is secured, high-voltage parts are made not to be touched easily, and further, hydrogen is prevented from entering the vehicle compartment.

SUMMARY OF THE INVENTION

The present invention solving above-described problems is a fuel cell loading type electric vehicle, including:

a fuel cell which generates electricity by being supplied with fuel and an oxidizer; thermoregulator for adjusting the temperature of the fuel cell; fuel reservoir for storing the fuel to supply to the fuel cell; humidifier to supply moisture to the fuel cell by humidifying at least either one of the fuel from the fuel reservoir or the oxidizer using a humidification; wherein the thermoregulator, the fuel cell, the humidifier, and the fuel reservoir are arranged in series from a front vehicle compartment of the vehicle to a rear compartment of the vehicle in this order.

According to this invention, thermoregulator, fuel cell, humidifier, and fuel reservoir are arranged in series from a front vehicle compartment of the vehicle to a rear compartment of the vehicle in this order. Accordingly, since these apparatus do not mass in a front vehicle compartment and control of height is possible for the thermoregulator which is arranged in a front vehicle compartment, step-on space of a vehicle compartment and interior of a room and load room space are fully securable.

In the fuel cell loading type electric vehicle of this invention, said fuel cell is preferably arranged under the floor provided in substantially central longitudinal location of the vehicle.

By employment of this arrangement, the fuel cell to which the weight added is arranged under the floor provided in the substantially central longitudinal location of the vehicle. Whereby, since the weight balance in fore to rear direction of the vehicle can be more preferably distributed, the behavior stability of vehicles can be raised. Also, since the fuel cell was arranged under the floor provided in the substantially central longitudinal location of the vehicle, even when vehicles collide head-on or collide from backward, the fuel cell can be hard to be damaged. Further, it is preferable to arrange said fuel cell in the central longitudinal location of the vehicle in the fuel cell system box provided under the floor of the vehicles; to arrange at least a part of said thermoregulator in the longitudinally forward of the fuel cell in the fuel cell system box; and to arrange the humidifier in the back of the the fuel cell.

A fuel cell system box thus arranged contains thermoregulator and humidifier in addition to a fuel cell. This renders an advantage such that productivity is excellent at the time of production process and also decomposition check and repair etc. can be facilitated.

Further, it is preferable that fuel cell output interception means to determine whether or not electric power extraction of the fuel is possible or whether or not interception is carried out, and fuel supply adjustment means to adjust and supply the state of the fuel to the fuel cell are arranged.

With this arrangement, fuel cell output interception means to determine whether or not electric power extraction of the fuel is possible or whether or not interception is carried out and fuel supply adjustment means to adjust and supply the state of the fuel to the fuel cell are respectively provided adjacent to the fuel cell. In this manner, the fuel cell output interception means which is directly connected to the fuel cell and the fuel supply adjustment means are provided adjacent to the fuel cell. This contributes to shorten the electric wiring and piping for fuel supply.

Also, the fuel cell output interception means may be placed on the fuel cell.

Since the fuel cell output interception means is placed on a fuel cell and a fuel cell output interception means is arranged in a high position, getting wet preventing nature can be raised. It becomes unnecessary moreover, to extend the installation space of a fuel cell output interception means in a transverse direction.

As preferred embodiment of this invention, in a fuel cell loading type electric vehicle a radiator from the thermoregulator which cools a heat medium by the wind buffeted thereon by running of the vehicle is arranged in the front position of the vehicle. Also, the traction motor is arranged immediately behind the radiator.

According to one aspect of the invention, the fuel cell is equipped with pluralities of cells, and the pluralities of cells are stacked longitudinally along the vehicle. Thus, deviation and bending between the cell laminate occurred on the occasion of acceleration and deceleration of the vehicle can be controlled. Then, the cell laminate structure can be maintained substantially.

According to another aspect of the invention, a fuel cell loading type electric vehicle includes:

A fuel cell which generates electricity by being supplied with fuel and an oxidizer; thermoregulator to adjust the temperature of the fuel cell by sending out cooling fluid through tubes; fuel reservoir to store the fuel for supplying to the fuel cell; and humidifier to supply moisture to the fuel cell by humidifying at least either fuel or the oxidizer from the fuel reservoir using a humidification; wherein the fuel cell is arranged in the central longitudinal location of the vehicle in the fuel cell system box prepared under the floor arranged in the substantially central longitudinal location of the vehicle, wherein at least a part of the thermoregulator is arranged in either front or rear side of the fuel cell in the fuel cell system box, and the humidifier is arranged in another front or rear side of the fuel cell.

According to another aspect of the present invention, there is provided a fuel cell loading type electric vehicle as set forth in Claim 6, wherein the fuel cell is equipped with pluralities of cells, and the pluralities of cells are stacked longitudinally along the vehicle.

In this embodiment, a fuel cell is arranged in a fuel cell system box at a central position, and thermoregulator and humidifier are prepared in the forward of or rearward of the fuel cell respectively. Therefore, since the fuel cell to which the weight added most among these apparatus accommodated in a fuel cell system box is arranged in the central longitudinal position, the longitudinal weight balance can be preferably kept. Also, since the fuel cell is arranged in the center, even if it is the case where the vehicle collides head-on or collides from backward, breakage of a fuel cell can be prevented.

In this embodiment, the fuel cell is equipped with pluralities of cells. The pluralities of cells are preferably in the profile of lamination in the longitudinal direction of the vehicle.

In this embodiment, pluralities of cells are in the profile of lamination in the longitudinal direction of the vehicle. Therefore, deviation and bending between the laminating of a cell can be controlled on the occasion of acceleration and deceleration of the vehicle, so that the cell laminate structure can be maintained substantially.

According to another aspect of this invention, a fuel cell system box is provided, wherein a fuel cell which is used for a car and generates electricity by being supplied with fuel and an oxidizer is carried therein, a box portion with upper part opened is contained, and the box portion includes:

thermoregulator to adjust the temperature of the fuel cell by sending out cooling fluid through tubes; fuel cell output interception means to determine whether or not electric power extraction from the fuel cell is possible and whether or not interception is carried out; and humidifier to supply moisture to the fuel cell by humidifying at least either fuel or the oxidizer from the fuel reservoir using a humidification; and the thermoregulator; the fuel cell output interception means; and the humidifier are formed as a respectively individual unit, wherein a blanket which seals the upper opening part of the box portion which accommodated the fuel cell and each unit is provided.

The fuel cell system box of this invention includes functionally divided unit such as humidifier, cooling means, and control means as individually separated unit respectively. This renders an advantage such that productivity is excellent and also decomposition check and repair etc, can be facilitated.

Also, these units are accommodated in a box portion and the upper opening part of a box portion is sealed by a blanket. This preferably contributes to protecting the respective unit in the box portion from water, mud, and stone and dust and the like. In addition, this contributes to preventing the maintenance member and the like from touching high-voltage parts etc. inadvertently, or hydrogen leaked out from the fuel cell from entering the vehicle compartment etc.

PREFERABLE EMBODIMENT OF THE INVENTION

Exemplary embodiment of this invention will now be specifically discussed in conjunction with the drawings.

Figure 1:
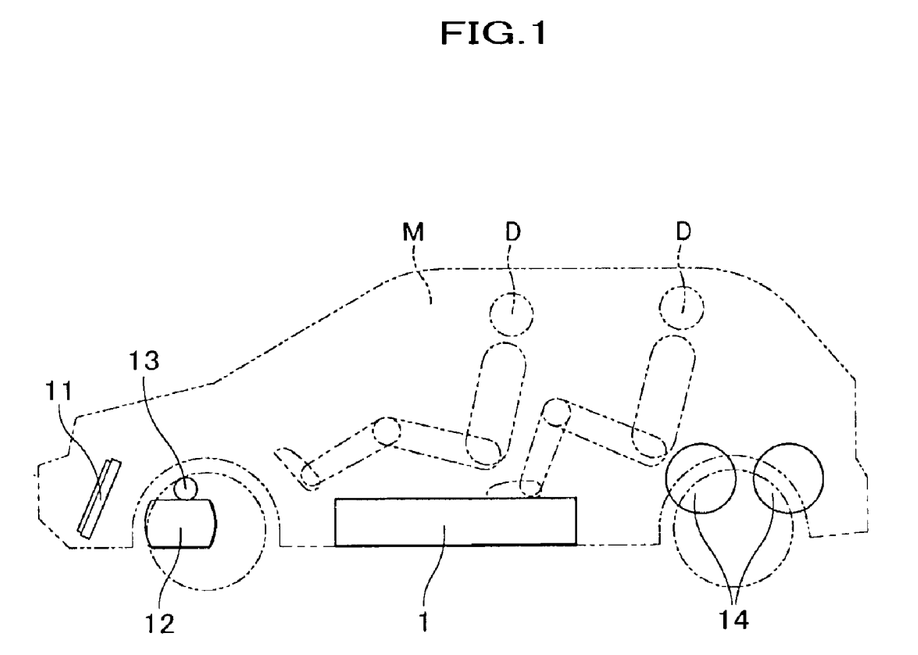
FIG. 1 is a perspective side view of a fuel cell loading type electric vehicle according to the present invention.

FIG. 1 is a perspective side view of a fuel cell loading type electric vehicle according to the present invention.

As shown in FIG. 1, in the fuel cell loading type electric vehicle (henceforth referred to as "vehicle") M, the fuel cell system box 1 according to this invention is carried under the floor. The vehicle compartment where drivers D and D etc. ride is formed above the fuel cell system box 1. A radiator 11 is forwardly located in the Vehicle M. Also, a motor driven mechanism 12 including a traction motor of this invention is arranged in rearward of the radiator 11, and an air compressor 13 is arranged above the motor driven mechanism 12. Further, a fuel cell system box 1 is arranged in rearward of the air compressor 13, and the high-pressure hydrogen containers 14 and 14 which correspond to the fuel reservoir of this invention are arranged in rearward of the fuel cell system box. The hydrogen which is the fuel supplied to a fuel cell 30 is stored in the high-pressure hydrogen containers 14 and 14.

The air which is heating medium is cooled by the wind buffeted thereon by running of the Vehicle M. in a radiator 11. The air compressor 13 is used for sending out the air supplied to the fuel cell 30 as an oxidizer. However, this air compressor 13 may be used for driving the air conditioning etc, (not shown) used in the vehicle compartment.

Figure 2:
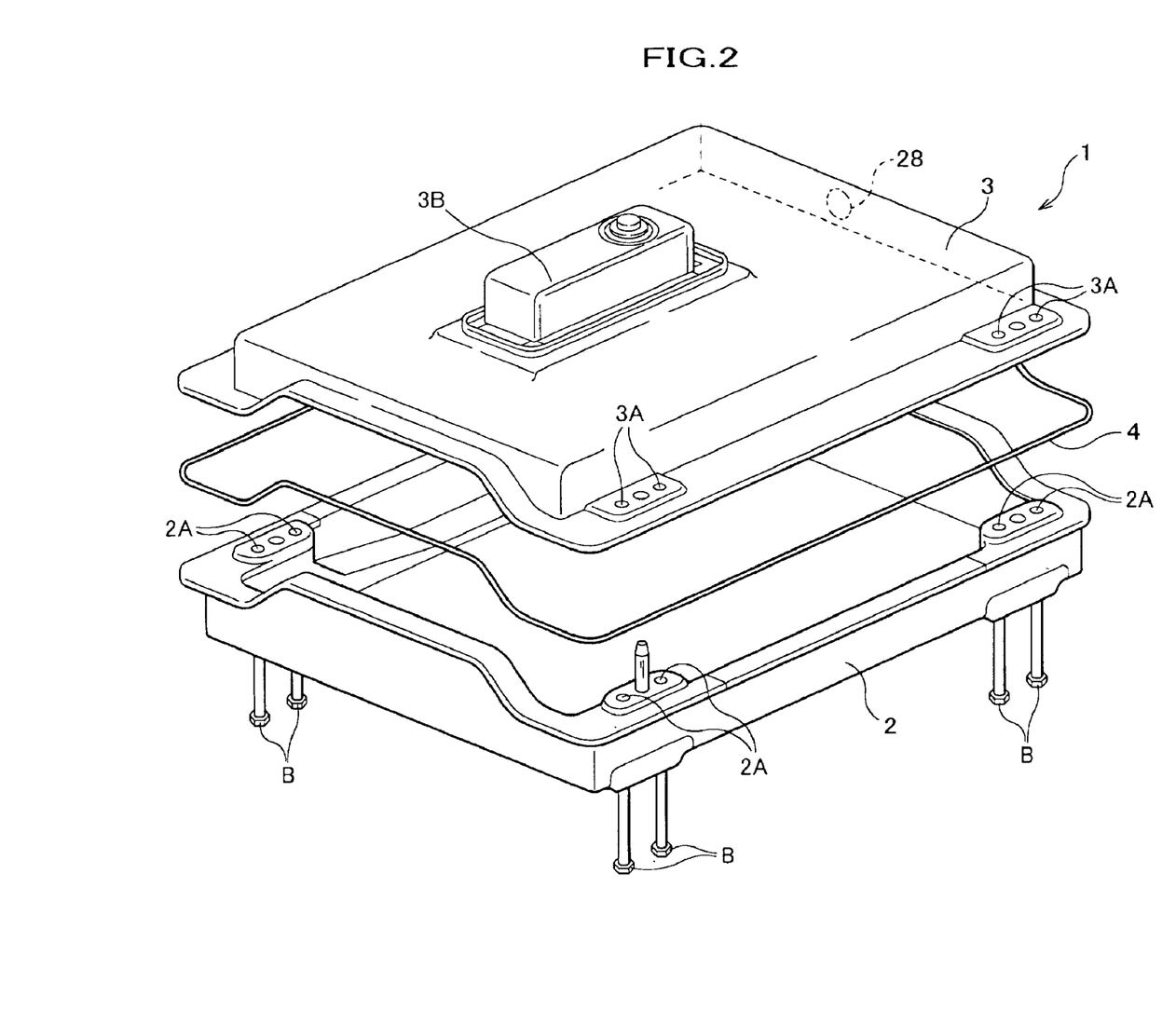
FIG. 2 is a perspective view of a fuel cell system box.

A fuel cell system box 1 includes a fuel cell system box main part which corresponds to a box portion of this invention (henceforth referred to as "box main part") 2 and the cover 3 which corresponds to a blanket of this invention. The upper opening part of the box main part 2 is covered with the cover 3. Further, the seal 4 is interposed between the box main part 2 and the cover 3, and the upper opening part of the box main part 2 is sealed by the cover 3. The four corners of the box main part 2 have bolthole 2A and 2A formed thereon respectively, and the four corners of the cover 3 have bolthole 3A and 3A formed therein. Bolt B and B are screwed in these bolthole 2A and 2A, or bolthole 3A and 3A, correspondingly, so as to be screwed in the nut prepared in a vehicle body frame (not shown) in the vehicle M, while the box main part 2 and the cover 3 are being secured simultaneously. By employing this threaded type structure, the fuel cell system box 1 is attached and fixed to a body frame. Also, projection part 3B is formed in the central part of the upper surface of the cover 3.

Figure 3:
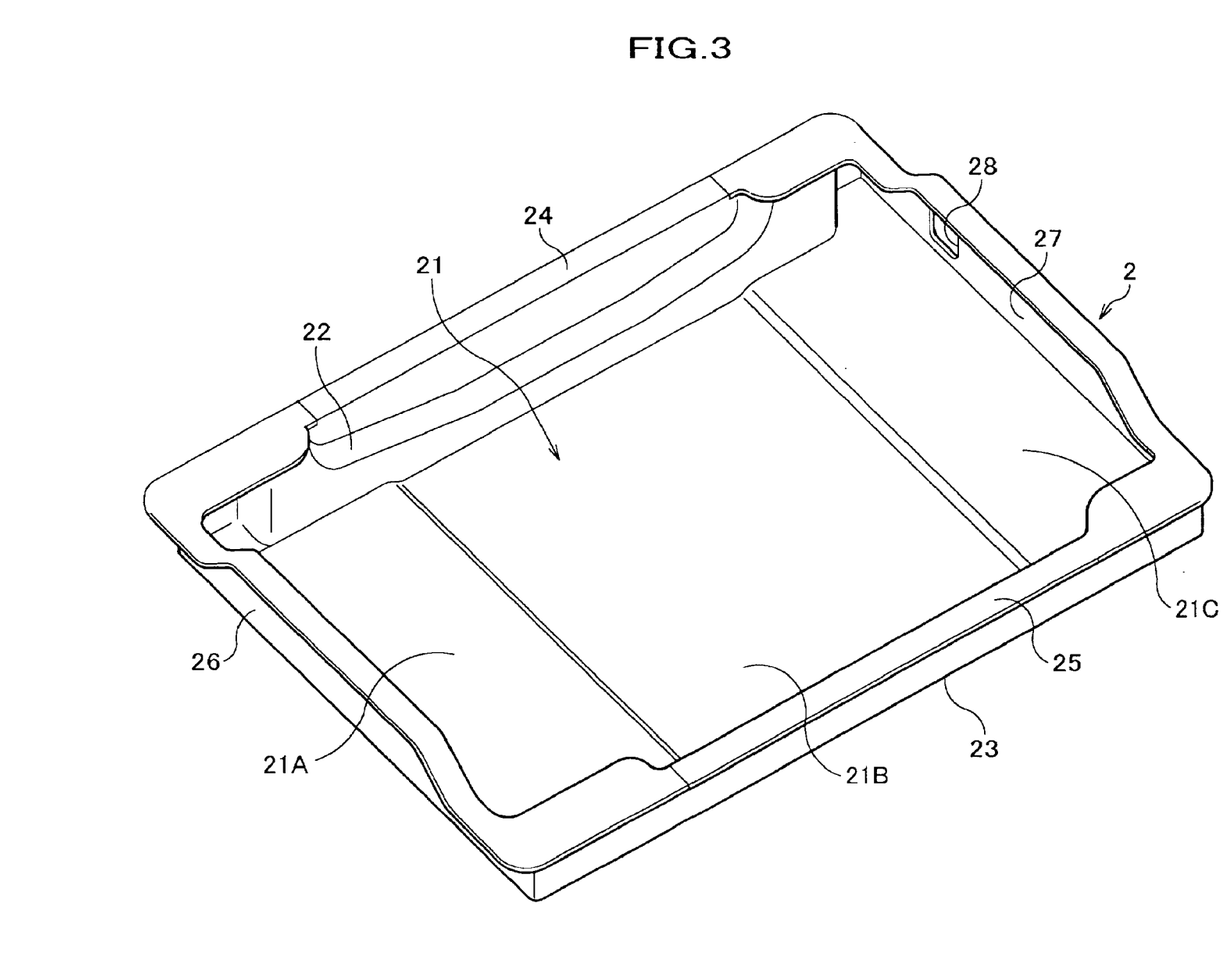
FIG. 3 is a perspective view of a fuel cell system box.

As shown in FIG. 3, the box main part 2 is equipped with a bottom panel 21, and the right-and-left side part frames 22 and 23 are formed in both of the right-and-left sides of the bottom panel 21, respectively. Also, side panels 24 and 25 are formed in each upper part of the right-and-left side part frames 22 and 23. The front panel 26 is formed forwardly of the box main part 2, the rear panel 27 is formed in the back. Hydrogen discharging hole 28 disposed in the box in the back for a discharge of hydrogen which leaked in the cover 3 is provided in the rear panel 27.

Figure 4A:
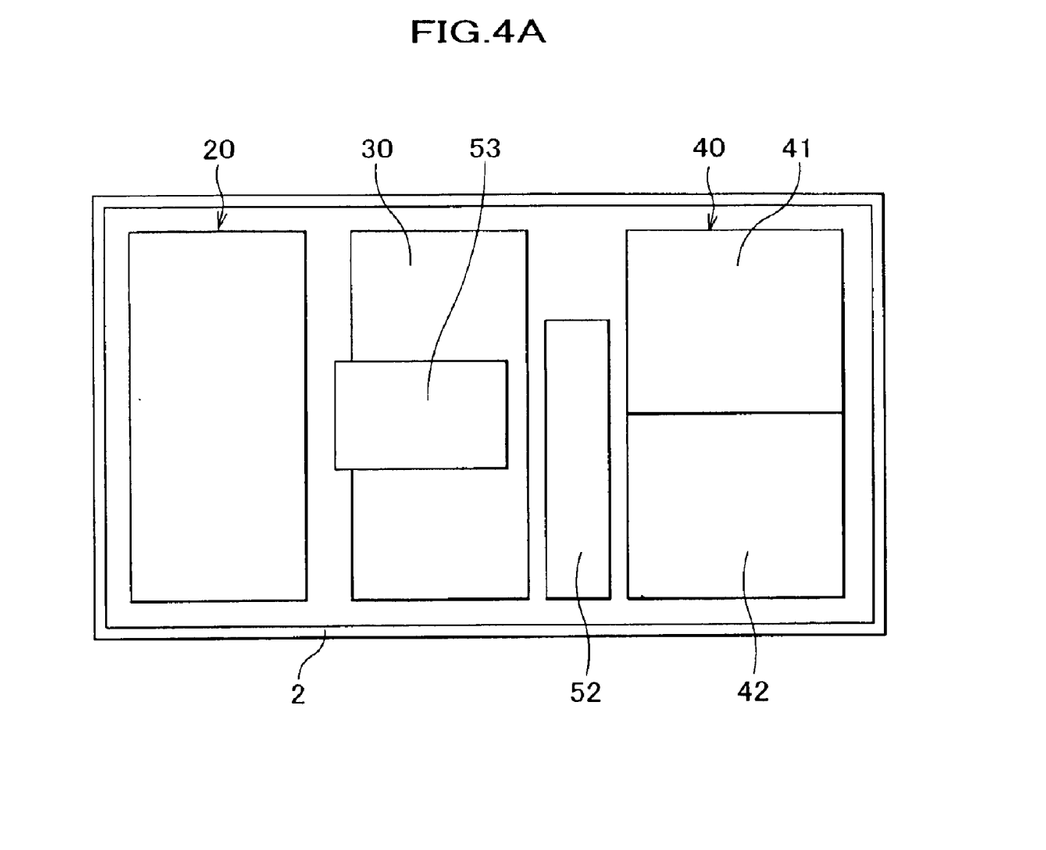
FIG. 4A is a top view showing the arrangement in a fuel cell system box.
Figure 4B:
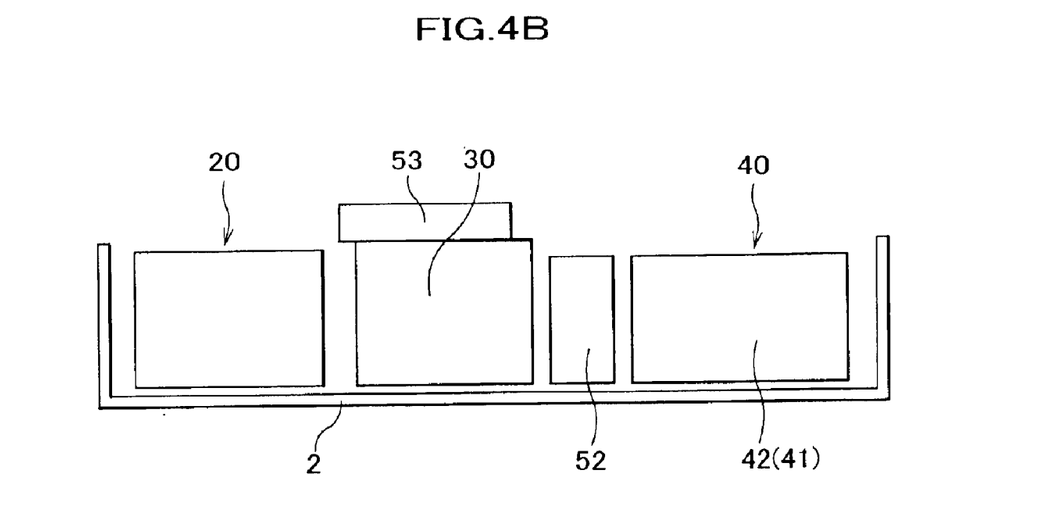
FIG. 4B is a side view thereof.

A box main part 2 is set up as thermoregulator installation position 21A, fuel cell installation position 21B, and humidifier installation position 21C in order from the front. And as shown in FIG. 4, the thermoregulator 20, the fuel cell 30, and the humidifier 40 are placed in the inside of the box main part 2 sequentially from the front. The fuel cell system is constituted by a radiator 11, a high-pressure hydrogen container 14, and 14 in addition to thermoregulator 20 prepared in the fuel cell system box 1, a fuel cell 30, and humidifier 40. The high-pressure hydrogen containers 14 and 14 arranged behind the fuel cell system box 1 are arranged so that the longitudinal position thereof may become almost the same as the rear wheel of the vehicle. Thus, the thermoregulator 20, the fuel cell 30, the humidifier 40, and the high-pressure hydrogen containers 14 and 14 are disposed covering from the front position to the back position of the Vehicle M, and arranged in this longitudinal direction of the Vehicle M in this order.

The thermoregulator 20, the fuel cell 30, and the humidifier 40 formed as individual unit respectively are arranged in the inside of the fuel cell system box 1 arranged under the floor of the vehicle M. The thermoregulator 20 sends out a coolant from the fuel cell 30 to a heat exchanger such as a radiator 11 through tubes. Then, the coolant which became high temperature, for example is subjected to be treated under a heat exchanger such as a radiator 11 to be cooled, to thereby be sent to the fuel cell 30. The pump for a liquid transfer can be used for this transfer, however, mechanical drive employing the torque of a turbine using the energy resides in discharge gas may also be used. Also, the thermoregulator is alternatively applied such constitution as to adjust temperature in which the electric formula heater for example, comprising nichrome line etc. is twisted around the tube, through which the coolant passes. In this case, when the temperature of the fuel cell falls, temperature adjustment is performed so as to make the temperature of the fuel cell elevated by warming the coolant.

Figure 5:
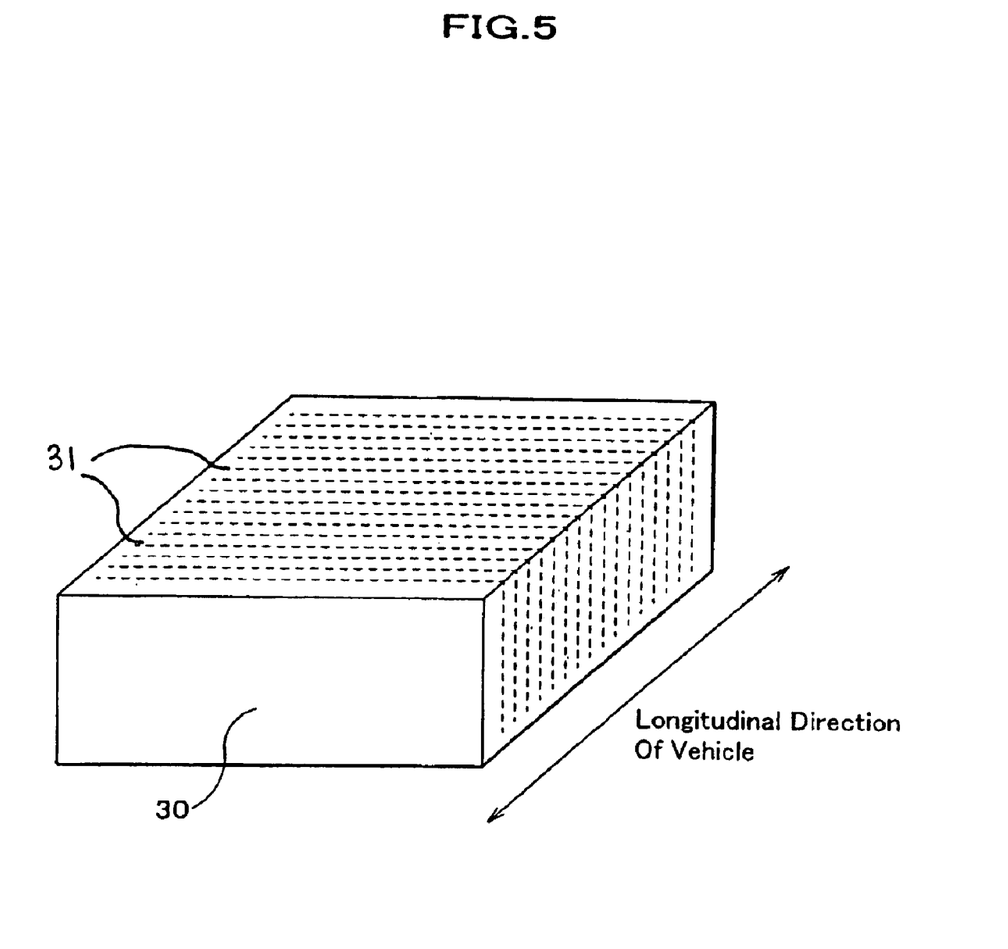
FIG. 5 is a partially sectioned perspective view of a fuel cell.

A fuel cell 30 generates electricity by being supplied with hydrogen which is fuel, and the oxygen which is an oxidizer. As shown in FIG. 5, it has pluralities of cells, for example hundreds of cells 31 and 31—are contained therein, and these cells 31 and 31—constitute a cell laminates. These cell laminates are formed in two of right and left, and such pluralities of cells 31 and 31—are stacked along the longitudinal direction of the vehicle, to thereby constitute the cell laminates. In this manner in which cell 31 and 31—are longitudinally stacked, the shearing stress or bending stress is hard to be applied between the cell laminates (between the adjacent cells 31 and 31) compared with the case of being stacked in the right-and-left direction. Then, deviation or bending between the cells is hard to be involved therein. Accordingly, the cell laminates structure can be maintained substantially.

Humidifier 40 is intended for moisture to be supplied to a fuel cell 30 and equipped with the anode side humidifier 41 and the cathode side humidifier 42 as shown in FIG. 4. The anode side humidifier 41 and the cathode side humidifier 42 are formed in a united manner in right to left in a row. Incidentally, in this embodiment the anode side humidifier 41 and the cathode side humidifier 42 are formed in right to left in a row. However, alternative arrangement may be applied such as fore to rear arrangement in a row according to the relation with peripheral equipment. With the anode side humidifier 41, the hydrogen supplied to the anode side in a fuel cell 30 is humidified so that it may become moderate humidity. Also, with the cathode side humidifier 42, the air which is the oxidizer supplied to a cathode side is humidified so that it may become moderate humidity.

Further, hydrogen supply adjustment means 52 which is a fuel supply adjustment means of this invention, and fuel cell output interception means 53 are provided adjacent to a fuel cell 30 respectively in the circumference of the fuel cell 30, respectively. The hydrogen supply adjustment means 52 is used when hydrogen is determined as a fuel and adapted to perform hydrogen supply while adjusting the flux and the amount of states of pressure demanded sequentially according to the reaction of the fuel cell 30, and constituted of the combination of such as pumps and valves. Drive of this pumps and valves may be based on the power by either electric motor or fluid, or mechanical power and the like. The fuel cell output interception means 53 is provided adjacent to the fuel cell 30 and formed in the profile of being placed on a fuel cell 30. The fuel cell output interception means 53 includes a switch (not shown). It is adapted to determine by manipulating this switch whether or not electric power extraction from a fuel cell 30 is possible or whether or not interception is carried out.

In the fuel cell loading type electric vehicle with above described arrangement, a fuel cell 30 etc. is accommodated in the fuel cell system box 1. Hence, the situation that a driver and the like touches the high-voltage portion in the fuel cell 30 etc. inadvertently can be obviated. Further, the fuel cell 30, the humidifier 40, and thermoregulator 20 etc, can aim at improvement in protection and maintenance nature etc. by being accommodated in the fuel cell system box 1 in the bottom of the floor. Furthermore, the fuel cell 30 to which the weight comparatively added is arranged in the central position in the fuel cell system box 1, and the fuel cell system box 1 is arranged in the central longitudinal position of the vehicles M. This corresponds to a substantially center-of-gravity position. The weight balance of the vehicles M can be thus stabilized. Consequently the behavior stability thereof can also be raised. Also, each cell 31 in a fuel cell 30 and 31—is stacked longitudinally along the vehicle. Therefore, even when the vehicle M performs acceleration and deceleration, deviation and bending between the cells 31 and 31—are controlled to allow substantial cell laminates structure to be maintained. Thus, the fall of the power generation performance of the fuel cell 30 can be preferably prevented. Further, the fuel cell output interception means 53 is adjacently prepared on the fuel cell 30, in the profile of being placed thereon. Therefore, since the fuel cell output interception means 53 will be arranged in a comparatively high position, getting-wet preventing nature of the fuel cell output interception means 53 is raised. And it is preferable if the fuel cell output interception means 53 is arranged in the position of the center console of the vehicle compartment, since it is stored in the space which does not bar operation of the crew member who sits on a driver's seat or a passenger seat. Furthermore, the electric cable between the fuel cell output interception means 53 and a fuel cell 30 can be shortened. Whereas, referring to the apparatus which needs drainage of such as hydrogen supply adjustment means 52, since it is arranged in the comparatively low position adjacent to the fuel cell 30, the drainage nature can be raised.

Furthermore, a radiator 11 in the thermoregulator 20 is arranged in the front position of the vehicle where vehicle speed utilization ratio is high, the fuel cell 30 is arranged in the back, and the air compressor 13 and the thermoregulator 20 are provided between the radiator 11 and the fuel cell 30. Therefore, since the distance of piping for cooling ends in the shortest distance which is suffice to secure insulated distance, distance of piping can be shortened on the whole. Accordingly, the quantity of a coolant and the weight of piping can be made to be reduced. This contributes to a smaller size and lighter weight tendency of the vehicle body. And since the thermoregulator 20 is comparatively easy to perform height adjustment, step-on space in the front seat of the vehicle compartment is secured. Further, since the humidifier 40 is provided between the fuel cell 30 and the high-pressure hydrogen containers 14 and 14, and also the humidifier 40 is formed in the near position in the back of the fuel cell 30, hydrogen piping can be shortened. Hence, the quantity of the hydrogen in hydrogen piping can be reduced, with the result that a control response can be raised. Furthermore, since the anode side humidifier 41 in the humidifier 40 is arranged between a fuel cell 30 and the high-pressure hydrogen containers 14 and 14. Consequently, hydrogen piping can be shortened and a fuel cell 30 can be humidified in the state of being hard to generate dew condensation etc.

Furthermore, the humidifier 40 arranged between a fuel cell 30 and the high-pressure hydrogen containers 14 and 14 is provided with the anode side humidifier 41 and the cathode side humidifier 42 in a united manner. This makes it possible to achieve a short circuit of hydrogen piping, and also thereby cutting down the length of piping which pass along the humidifier 40 to contribute to scaling down the size and weight of the vehicle body.

On the other hand, a fuel cell system box 1 has thermoregulator 20, a fuel cell 30, and humidifier 40 formed as an individually separated unit by each function therein. Therefore, when a part of device in the thermoregulator 20 breaks, for example, since it can be fixed by removing only the thermoregulator 20 having a thermoregulation function, repair will become easy. As for this repair, it can be said the same thing about the case where it is generated in any of the fuel cell 30 and the humidifier 40.

Also, when a fuel cell system box 1 is manufactured, a thermoregulator 20, a fuel cell 30, and a humidifier 40 are also manufactured in parallel with this. Namely, after assembling work of them is done, the thermoregulator, the fuel cell 30, and the humidifier 40 are accommodated in the box main part 2, thereby saving manufacturing time.

On the other hand, after accommodating thermoregulator 20, a fuel cell 30, and humidifier 40 in the box main part 2, the upper opening part of the box main part 2 is sealed by the cover 3, so as to preferably protect the thermoregulator 20, the fuel cell 30, and the humidifier 40 from water, mud, and stone and dust etc. Also, the fuel cell 30 containing high-voltage parts is accommodated in the box main part 2, and is sealed with the cover 3. Hence, the situation where a maintenance member etc. touches high-voltage parts, for example can be prevented. Furthermore, even when it is the case where hydrogen is leaked from a fuel cell 30 or anode side humidifier 41, the box main part 2 is sealed and the air for discharge of the hydrogen is introduced therein so as to discharge it from the hydrogen discharge hole formed in a box behind the cover 3. Therefore, even in the case where the fuel cell system box 1 is arranged in the lower part of the vehicle compartment in the vehicle, the hydrogen can be reliably discharged outside the vehicle without leaking into the vehicle compartment.

Hereinbefore, various preferable embodiments were explained, but the present invention is not construed as being limited thereto. For example, according to the embodiment, hydrogen stored in a high-pressure hydrogen container is used as fuel. However, this application can be modified to any variations in which a hydrogen tank which accommodated the hydrogen storing metal alloy can be substituted, or another mode which takes out hydrogen by reforming the original fuel such as a methanol system. In this case, an original fuel tank, a reformer, etc. are needed. Then, the original fuel tank is preferably arranged in the position where the high-pressure hydrogen container was prepared, and the reformer is preferably arranged between the original fuel tank and the fuel cell.

What is claimed is:

1. A fuel cell electric vehicle, comprising
   a fuel cell which generates electricity by being supplied with fuel and an oxidizer;
   a thermoregulator to adjust a temperature of said fuel cell by sending out cooling fluid through tubes;
   a fuel reservoir to store said fuel for supplying to said fuel cell; and
   a humidifier to supply moisture to said fuel cell by humidifying at least one of the fuel from said fuel reservoir and said oxidizer;
   wherein said thermoregulator, said fuel cell, said humidifier and said fuel reservoir are serially arranged and aligned along a longitudinal axis of the vehicle in an arrangement extending from a front position of the vehicle to a rear position of the vehicle, with said fuel cell arranged longitudinally rearward of said thermoregulator, said humidifier arranged longitudinally rearward of said fuel cell, and said fuel reservoir arranged longitudinally rearward of said humidifier in the vehicle.

2. A fuel cell electric vehicle as set forth in claim 1, wherein said fuel cell is arranged in a bottom of a floor of the vehicle arranged in a substantially central longitudinal position of the vehicle.

3. A fuel cell electric vehicle as set forth in claim 2, wherein said fuel cell is disposed in the central longitudinal position of said vehicle in a fuel cell system box arranged under the floor of the vehicle; wherein at least a part of said thermoregulator is arranged ahead of said fuel cell in said fuel cell system box, and said humidifier is arranged behind said fuel cell.

4. A fuel cell electric vehicle as set forth in claim 3, further comprising fuel cell output interception means to determine whether or not electric power extraction of said fuel cell is possible or whether or not interception is carried out, and fuel supply adjustment means to adjust and supply the state of the fuel to said fuel cell.

5. A fuel cell electric vehicle as set forth in claim 4, wherein said fuel cell output interception means is placed on said fuel cell.

6. A fuel cell electric vehicle as set forth in claim 1, wherein a radiator from said thermoregulator which cools a heat medium by wind buffeted thereon by running of said vehicle is arranged in a front position of said vehicle, and a traction motor is arranged immediately behind the radiator.

7. A fuel cell electric vehicle as set forth in claim 1, wherein said fuel cell is equipped with a plurality of cells stacked longitudinally along said vehicle.

8. A fuel cell electric vehicle as set forth in claim 6, wherein said fuel cell is equipped with a plurality of cells stacked longitudinally along said vehicle.

9. A fuel cell electric vehicle, comprising a fuel cell which generates electricity by being supplied with fuel and an oxidizer; a thermoregulator to adjust a temperature of said fuel cell by sending out cooling fluid through tubes; a fuel reservoir to store said fuel for supplying to said fuel cell; and
   a humidifier to supply moisture to said fuel cell by humidifying at least one of said fuel from said fuel reservoir and said oxidizer; wherein
   said fuel cell is arranged in a central longitudinal position of said vehicle in a fuel cell system box provided in a bottom of a floor disposed in a substantially central longitudinal position of said vehicle;
   wherein at least a part of said thermoregulator is arranged in one side of the front or back of said fuel cell in said fuel cell system box and said humidifier is arranged in the other side of the front or back of said fuel cell.

10. A fuel cell electric vehicle as set forth in claim 9, wherein said fuel cell is equipped with a plurality of cells stacked in the longitudinal direction of said vehicle.

11. A fuel cell system box, wherein a fuel cell used for a car which generates electricity by being supplied with fuel and an oxidizer is carried, while having a box portion having an upper part that is opened, said box portion comprising:
    a thermoregulator to adjust a temperature of said fuel cell by sending out cooling fluid through tubes; fuel cell output interception means to determine whether or not electric power extraction of said fuel cell is possible or whether or not interception is carried out; and a humidifier to supply moisture to said fuel cell by humidifying at least either fuel from said fuel reservoir or said oxidizer using a humidifier;
    wherein said thermoregulator, said fuel cell output interception means, and said humidifier are formed as an individual unit and a blanket to seal the upper part of said box portion accommodating said fuel cell.

* * * * *